(12) United States Patent
Garitte et al.

(10) Patent No.: US 12,288,901 B2
(45) Date of Patent: Apr. 29, 2025

(54) DISCONNECTION DEVICE COMPRISING A HEAT ACTIVATABLE ELEMENT

(71) Applicant: SAFT, Levallois-Perret (FR)

(72) Inventors: Emmanuelle Garitte, St Medard en Jalles (FR); Philippe Borel, Bruges (FR); Dinh An Nguyen, Pessac (FR); Mélanie Dendary, Eysines (FR); Laure Le Guenne, Blanquefort (FR)

(73) Assignee: SAFT, Levallois-Perret (FR)

( * ) Notice: Subject to any disclaimer, the term of this patent is extended or adjusted under 35 U.S.C. 154(b) by 539 days.

(21) Appl. No.: 17/782,419

(22) PCT Filed: Nov. 30, 2020

(86) PCT No.: PCT/EP2020/083977
§ 371 (c)(1),
(2) Date: Jun. 3, 2022

(87) PCT Pub. No.: WO2021/110606
PCT Pub. Date: Jun. 10, 2021

(65) Prior Publication Data
US 2023/0016438 A1 Jan. 19, 2023

(30) Foreign Application Priority Data
Dec. 6, 2019 (FR) ..................................... 1913899

(51) Int. Cl.
*H01M 10/653* (2014.01)
*H01M 50/581* (2021.01)

(52) U.S. Cl.
CPC ....... *H01M 50/581* (2021.01); *H01M 10/653* (2015.04); *H01M 2200/10* (2013.01)

(58) Field of Classification Search
CPC ............ H01M 50/581; H01M 10/653; H01M 2200/10; H01M 10/054; H01M 50/24; H01M 50/502; H01M 50/578; Y02E 60/10
See application file for complete search history.

(56) References Cited

U.S. PATENT DOCUMENTS

| | | | |
|---|---|---|---|
| 2012/0299690 A1 | 11/2012 | Nakanishi et al. | |
| 2016/0336582 A1* | 11/2016 | Byun | H01M 50/51 |
| 2017/0141358 A1* | 5/2017 | Lee | H01M 50/176 |

FOREIGN PATENT DOCUMENTS

| | | | | |
|---|---|---|---|---|
| DE | 10 2013 203 190 A1 | 10/2014 | | |
| DE | 10 2014 200 197 A1 | 7/2015 | | |
| DE | 10 2016 221 096 A1 | 4/2018 | | |
| EP | 2284929 A1 * | 2/2011 | ............ | H01M 10/42 |
| EP | 3 573 136 11 A2 | 11/2019 | | |
| FR | 2 962 261 A1 | 1/2012 | | |

OTHER PUBLICATIONS

International Search Report for PCT/EP2020/083977 dated, Jan. 26, 2021 (PCT/ISA/210).

* cited by examiner

*Primary Examiner* — Muhammad S Siddiquee
(74) *Attorney, Agent, or Firm* — Sughrue Mion, PLLC

(57) ABSTRACT

The present invention relates to a battery comprising: -i) at least two electrochemical elements (d) connected to one another by a connection part (c), each electrochemical element comprising a container, -ii) a material arranged between said at least two electrochemical elements, and -iii) at least one disconnection device, said device comprising: a heat-activatable element (a) able to deform when its temperature reaches a threshold value, the heat-activatable element being arranged such that, when its temperature reaches said threshold value, it disconnects the connection part (c) from at least one electrochemical element (d) through its deformation, said heat-activatable element not contributing to the conduction of electric current when an electric current flows through said electrochemical elements, said heat-activatable element being placed in contact with the connection part (c) and with a current output terminal.

15 Claims, 2 Drawing Sheets

[Fig. 1]
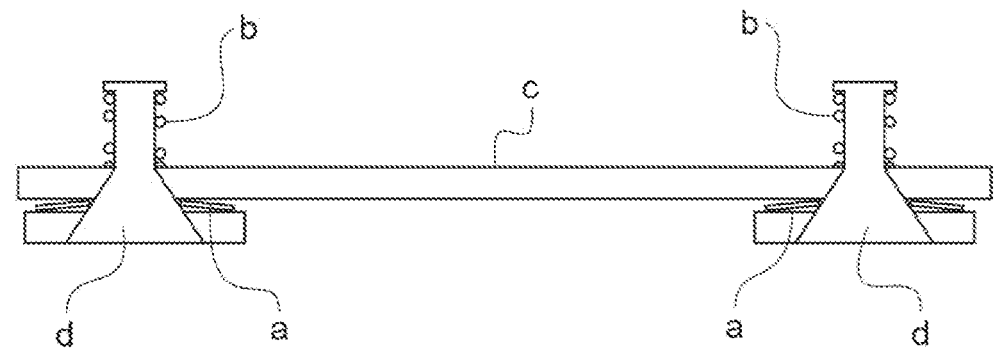
[Fig. 2]
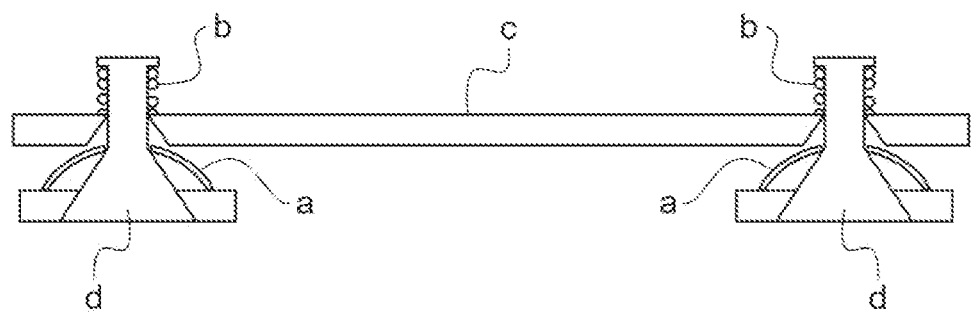
[Fig. 3]
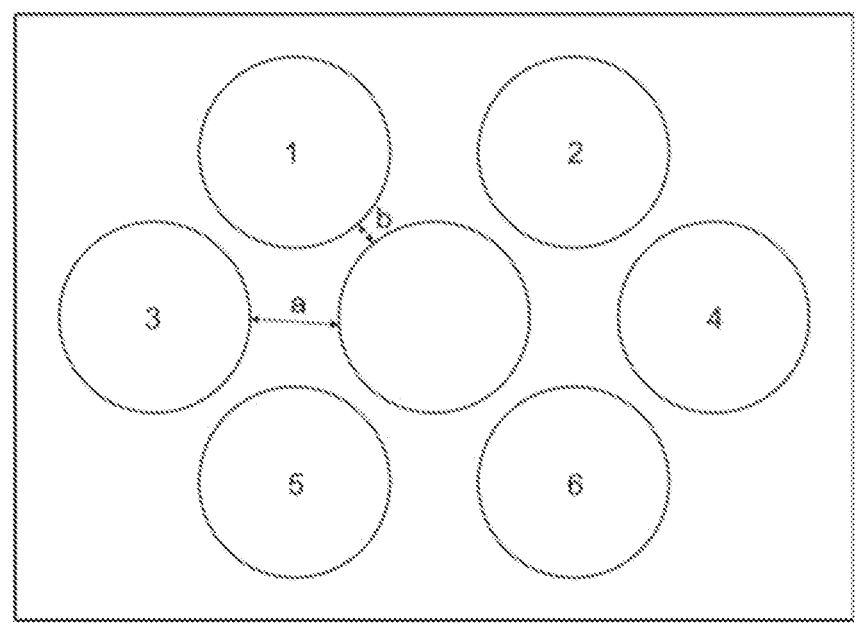

[Fig. 4]
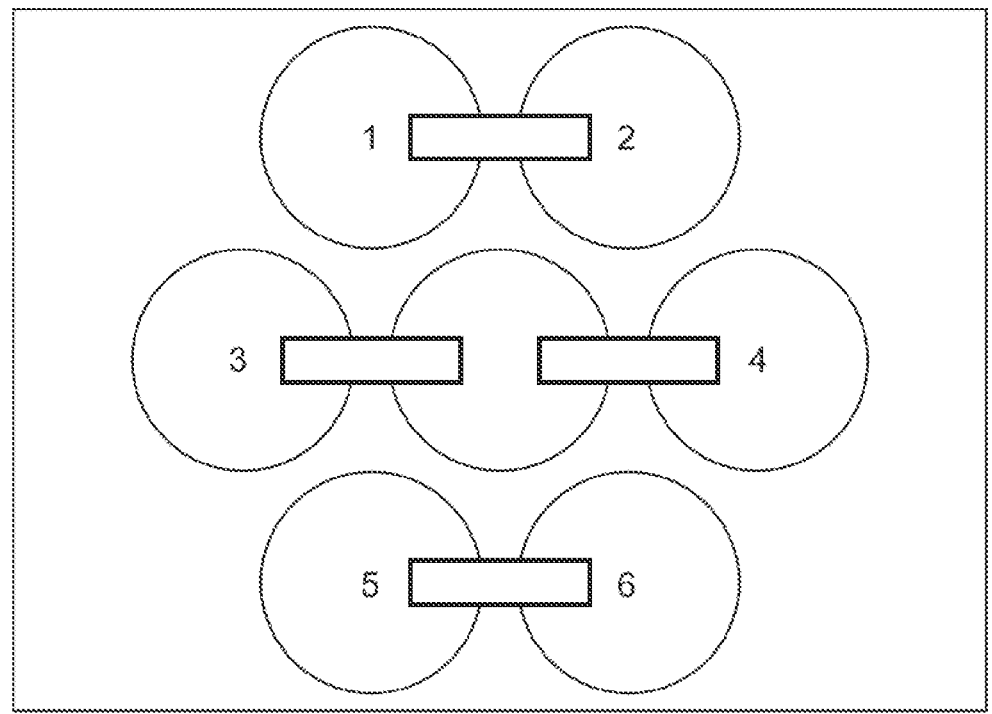
[Fig. 5]
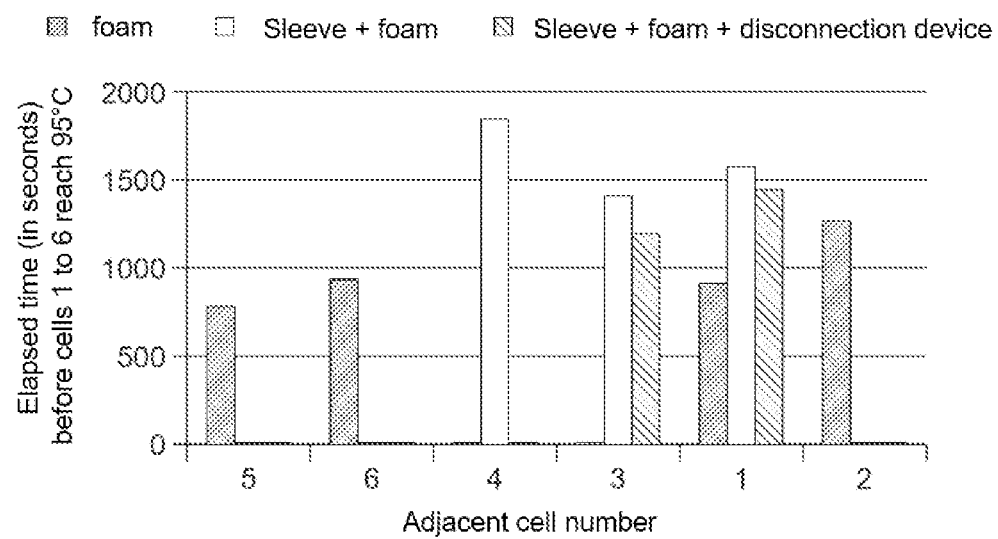

DISCONNECTION DEVICE COMPRISING A HEAT ACTIVATABLE ELEMENT

CROSS REFERENCE TO RELATED APPLICATIONS

This application is a National Stage of International Application No. PCT/EP2020/083977 filed Nov. 30, 2020, claiming priority based on French Patent Application No. 1913899 filed Dec. 6, 2019.

FIELD OF THE INVENTION

The present invention relates to a disconnection device, in particular to a disconnection device adapted to disconnect two electrochemical cells one from the other.

BACKGROUND ART

An electrochemical cell or electrochemical generator (these two terms being equivalent in the present specification) is an electricity generation device in which chemical energy is converted into electrical energy. Electrochemically active compounds deposited on at least one face of electrodes arranged in the electrochemical generator are at the origin of the chemical energy. Electrical energy is produced by electrochemical reactions during a discharge of the electrochemical generator. Electrodes, disposed in a container, are electrically connected to current output terminals that provide electrical continuity between the electrodes and an electrical consumer to which the electrochemical generator is associated. The positive and negative current output terminals may be attached to either the opposing face walls of the electrochemical generator container or be on the wall of a same face of the container.

A plurality of electrochemical cells may be connected together in series or in parallel depending on the nominal operating voltage of the electrical consumer and the amount of energy to be supplied to the consumer. The electrochemical cells are then placed in a common housing, and the assembly of the housing and the plurality of electrochemical cells is generally designated by the term battery. For the sake of convenience of electrical connection between electrochemical cells placed in a battery, the positive and negative current output terminals are often fixed on the wall of a same face of the container, often on a lid for closing the container of the generator.

An abnormality in the operation of the battery can be caused by the malfunction of one of the electrochemical cells (short-circuit, overcharge . . . ) or by external disturbance (impact, a rise in temperature, etc.) or by a failure of the electronic system managing the state of charge or other parameters of the cells of the battery.

For example, when a lithium electrochemical cell is overcharged, its temperature increases. The increase in temperature results in an increase in the charging current that further promotes temperature rise. If the cell does not have a cooling system sufficient to discharge the heat emitted, a situation of thermal runaway arises: the temperature rise is being spurred on by the cell itself. Uncontrolled increase in cell temperature results in the generation of gas that can result in an increase in internal pressure in the cell, which will result in the gas evacuation safety system opening. In the event of the release of hot gases, the temperature of which can reach 650° C., these gases come into contact with the other cells of the battery. There is now a risk of the thermal runaway phenomenon propagating to all of the cells of the battery, leading to the total destruction of the battery.

German Patent Application DE 10 2014 200 197 A1 discloses an electrical disconnection device activated by an increase in pressure or temperature. The device is a bimetal strip the deformation of which disconnects a circuit board associated with the cell. However, this device is placed between the terminals of a same cell. It is therefore an intra-cell device and not an inter-cell disconnection device.

In addition, the device disclosed in this document is a break disconnection device relying on zones of weakness in the current path, these zones of weakness however systematically generating current passage stress zones leading to heating in the presence of strong currents or simply limiting their use to very low power electrochemical cells.

German patent application DE 10 201 3 203 190 A1 and US patent application 2012/0293016 A1 disclose fuse-like devices that do not allow optimal high-current electrical conduction.

Applicant's French patent FR 2,962,261 discloses a battery of lithium electrochemical cells comprising a rigid fireproof foam with closed porosity made of an electrically insulating material filling the space between the inner wall of the casing of the battery and the free surface of the side wall of the container of each electrochemical cell. In this document, the insulating material is selected from the group consisting of polyurethane, epoxy, polyethylene, melamine, polyester, formophenol, polystyrene, silicone or a mixture thereof.

Nevertheless, the applicant has found that despite the presence of this material, a heat propagation phenomenon is observed between the cell exhibiting thermal runaway and those cells which are directly connected to it by metal bars.

This material does consequently not make it possible to prevent the propagation of heat via the connection members connecting two electrochemical cells to each other.

There is therefore a need to provide a device for controlling the propagation of heat via an inter-cell connecting part connecting at least two electrochemical cells together, subsequent to a thermal runaway phenomenon occurring in at least one of these two cells.

SUMMARY OF THE INVENTION

The invention provides a battery comprising:
i. at least two electrochemical cells (d) which are connected to each other by an inter-cell connecting part (c), each electrochemical cell comprising a container, said container comprising:
   α) an opening for introducing an electrochemical plate group,
   β) a bottom,
   γ) a side wall,
   δ) at least two current output terminals;
ii. a material having a thermal conductivity less than or equal to 0.5 W/(m*K) disposed between the at least two electrochemical cells, and
iii. at least one disconnection device for disconnecting said at least two electrochemical cells which are connected to each other by the inter-cell connection part, said device comprising:
   heat-activatable element (a) capable of deforming when a temperature thereof reaches a threshold value, the heat-activatable element being arranged such that, when its temperature reaches said threshold value, it disconnects by its deformation the inter-cell connecting part (c) from at least one of the electrochemical cells (d), said heat-activatable element not participating in the conduction of an electrical current when said electrochemical cells are traversed by an electrical current, said heat-activatable element being placed in contact with the inter-cell connection part (c) and a current output terminal.

According to one embodiment, the disconnection device further comprises at least one holding member (b), said holding member being capable of occupying a first position and a second position.

According to one embodiment, when a temperature of the heat-activatable element (a) is less than the said threshold value, the holding member (b) occupies the first position, in which the inter-cell connection part (c) is kept in contact with the at least one electrochemical cell (d) by the holding member (b).

According to one embodiment, when a temperature of the heat-activatable element (a) is greater than the threshold value, the holding member (b) occupies the second position, wherein the inter-cell connection part (c) is not in contact with the at least one electrochemical cell (d).

According to one embodiment, the deformation of the heat-activatable element (a) directly disconnects the inter-cell connection part (c) from said at least one electrochemical cell (d).

According to one embodiment, the heat-activatable element (a) is capable of deforming when its temperature reaches a threshold value greater than or equal to 80° C.

According to one embodiment the heat-activatable element (a) is selected from the group consisting of: a shape memory alloy, a bimetal, an intumescent material, a shape memory polymer, and a thermosensitive material.

According to one embodiment, the holding member (b) is a calibrated spring or a washer combined with a calibrated spring.

According to one embodiment the disconnection device does not act by restricting the cross-section for passage of current between the two electrochemical cells.

According to one embodiment the material having a thermal conductivity less than or equal to 0.5 W/(m*K) is in the form of a sleeve, a block, foam, a panel or paper.

According to one embodiment, the material having a thermal conductivity less than or equal to 0.5 W/(m*K) is in the form of a ceramic-based sleeve in contact with a part or all of the side wall of an electrochemical cell.

According to one embodiment, the ceramic-based sleeve is surrounded by a foam of a material selected from an epoxy, a polyurethane, a polyolefin, polystyrene, a polyester, a silicone.

According to one embodiment the ceramic-based sleeve has a thickness ranging from 0.5 to 50 mm, preferably ranging from 0.5 to 2 mm.

According to one embodiment, at least two electrochemical cells (d) are electrochemical cells selected from the group consisting of: lithium ion cells, sodium ion cells and lithium-sulfur cells.

According to one embodiment, the at least two electrochemical cells (d) are of cylindrical, prismatic or pouch-like format (pouch cells).

The disconnection device according to the invention makes it possible to disconnect at least two electrochemical cells connected to one another via an inter-cell connection part one from the other in order to prevent the propagation of heat from a faulty electrochemical cell to at least one other cell which is adjacent thereto. Disconnection is consequently thermal and/or electrical disconnection.

The disconnection device according to the invention also makes it possible to limit the time during which the at least one cell adjacent to the failed cell is exposed to temperatures likely to damage cells of the battery.

The disconnection device according to the invention can achieve a better heat dissipation when one of the cells is in thermal runaway.

In the case where the electrochemical cells are surrounded by a sleeve having a high thermal insulation capacity, it is found that the heat generated by the cell subject to thermal runaway propagates from cell to cell essentially via the inter-cell connection parts. The device according to the invention makes it possible to effectively limit the propagation of thermal runaway.

BRIEF DESCRIPTION OF THE DRAWINGS

FIG. 1 is a cross-sectional view of a disconnection device according to the invention when said device is not activated.

FIG. 2 is a cross-sectional view of a disconnection device according to the invention when said device is activated.

FIG. 3 is a diagrammatic representation of a modeling showing the layout of the cells and the distance which separates them from the central cell which is, in this example, in thermal runaway.

FIG. 4 is a diagrammatic representation of a modeling showing how the cells are connected to each other via inter-cell connecting parts.

FIG. 5 is a diagram showing the time at which electrochemical cells numbered 1 to 6 reach a temperature of 95° C. in the following 3 models:
  1st model: the electrochemical cells are all covered only with an epoxy-type foam (Foam);
  2nd model: the electrochemical cells are covered with a ceramic-based sleeve itself surrounded by an epoxy foam (Sleeve+foam);
  3rd model: a device according to the invention is used in the 2nd model described above (Sleeve+foam+disconnection device).

DETAILED DESCRIPTION OF THE INVENTION

The device used in the invention makes it possible to disconnect at least two electrochemical cells which are connected to each other by a connection part in order to prevent heat propagation via the inter-cell connection part.

The term "inter-cell connection part" is intended to mean any connecting part making it possible to physically connect two electrochemical cells to each other and ensure the passage of electrical current therebetween. The inter-cell connecting part may in particular be in the form of a metal strip or bar.

In one embodiment, the disconnection device further comprises at least one holding member, where the at least one holding member can occupy a first position and a second position. When a temperature of the heat-activatable element is less than the threshold value, the holding member occupies a first position, in which the inter-cell connection part is held in contact with the at least one electrochemical cell by the holding member. When a temperature of the heat-activatable element is greater than the threshold value, the holding member occupies a second position, in which the inter-cell connection part is not in contact with the at least one electrochemical cell.

In one embodiment, deformation of the heat-activatable element directly disconnects the inter-cell connection part from the at least one electrochemical cell. The heat-activatable element interrupts a connection between the electrochemical cell and the inter-cell connection part as a result of deformation of the heat-element. The heat-activatable element does not act on any intermediate part which in turn interrupts the connection between the electrochemical cell and the inter-cell connection part.

The deformation of the heat-activatable element can be reversible or irreversible.

According to one embodiment, the heat-activatable element is capable of deforming when its temperature reaches a threshold value greater than or equal to 80° C., or greater than or equal to 150° C., or greater than or equal to 200° C., or greater than or equal to 300° C., or greater than or equal to 400° C.

In one embodiment, the heat-activatable element is selected from the group consisting of: a shape memory alloy, a bimetal, an intumescent material, a shape memory polymer, and a thermosensitive material.

Preferably, when the deformation of the heat-activatable element is reversible, the latter is selected from the group consisting of: a bimetal, an alloy, a reversible shape memory polymer.

The holding member may be a calibrated spring or a washer combined with a calibrated spring.

The holding member may be an electrical conductor.

The holding member may be electrically conducting and not insulated from the inter-cell connection part.

The disconnection device does not act by restricting the cross-section for passage of current between the two electrochemical cells.

The device according to the invention is suitable for the passage of a current greater than or equal to 2.7 C; C being the nominal capacity of the cells of the battery.

The material disposed between the at least two electrochemical cells may have a thermal conductivity of less than or equal to 0.25 W/(m*K), or less than or equal to 0.1 W/(m*K). The thermal conductivity of this material is measured at an ambient temperature, i.e. between 20 and 30° C.

The material having a thermal conductivity less than or equal to 0.5 W/(m*K) may be in the form of a sleeve, block, foam, panel or paper. It can occupy the entire free space between two adjacent electrochemical cells or the entire free space between an electrochemical cell and a side wall of an enclosure intended to house the cells of the battery. The material may be in the form of a sleeve having a thickness of less than 5% or less than 1% of the container diameter of an electrochemical cell of cylindrical format. It may be in the form of a sleeve whose thickness can be less than 5% or less than 1% of the width or thickness of the container of an electrochemical cell of parallelepipedal (prismatic) format. It may be in the form of a ceramic block. It may be in the form of a ceramic-based sleeve in contact with part or all of the sidewall of an electrochemical cell.

The ceramic-based sleeve covers the free surface of the sidewall of the container of each cell over a length representing at least 50% of the height of the container, more preferably at least 75% of the height of the container and particularly preferably the entire height of the container.

The ceramic-based sleeve may include a metal oxide selected from $SiO_2$, $Al_2O_3$, $ZrO_2$, MgO, CaO, and a combination thereof.

The ceramic-based sleeve may be surrounded by a foam of a material selected from an epoxy, a polyurethane, a polyolefin, polystyrene, a polyester, a silicone.

Preferably, the foam surrounding the ceramic-based sleeve is an epoxy foam. The foam may partially or completely surround the ceramic-based sleeve.

The foam surrounding said ceramic-based sleeve can occupy the entire free space between two adjacent electrochemical cells themselves surrounded by said ceramic-based sleeve, or the entire free space between an electrochemical cell surrounded by said ceramic-based sleeve and a wall of an enclosure for housing the cells of the battery.

The ceramic-based sleeve may have a thickness ranging from 0.5 to 50 mm, preferably ranging from 0.5 to 10 mm.

According to one embodiment, when the ceramic-based sleeve is surrounded by said foam, then the ceramic-based sleeve has a thickness of between 0.5 and 2 mm, and the foam has a thickness of between 1 and 10 mm.

Preferably, the ceramic-based sleeve has a thickness ranging from 0.5 to 1.5 mm, preferably equal to about 1 mm; and the foam has a thickness ranging from 1 to 5 mm, preferably ranging from 2 to 3 mm.

The foam surrounding the ceramic sleeve may include a flame retardant compound selected from the group consisting of trichloropropyl phosphate (TCPP), triethyl phosphate (TEP), diethyl ethyl phosphate (DEPP), brominated polyether polyol, brominated phthalic anhydride, ammonium polyphosphate, encapsulated red phosphorus, or a mixture thereof.

The foam surrounding the ceramic sleeve may include fillers selected from the group consisting of aluminum trihydrate, calcium carbonate, barium sulfate, glass fibers, carbon fibers, melamine, carbon black, silicon oxide, or a mixture thereof.

The density of the foam may vary between 5 and 800 kg/m$^3$.

The invention applies to all types of electrochemical cells but is more particularly applicable to electrochemical cells selected from the group consisting of lithium-ion-type cells, sodium-ion-type cells, and lithium-sulfur cells.

The at least two electrochemical cells may be of cylindrical, prismatic or pouch-like format.

One or two disconnection devices may be used per inter-cell connection part.

Preferably, two disconnection devices are used per inter-cell connection part.

In the case where only one disconnection device is used per inter-cell connection part, the disconnection device is placed in contact with the current output terminal having the highest thermal conductivity. For example, in the case of a lithium-ion cell that generally has a copper negative terminal and an aluminum positive terminal, the disconnection device will be placed in contact with the copper terminal.

The invention will be better understood with reference to FIGS. 1 and 2 which show a cross-sectional view of a disconnection device according to the invention respectively when said device is inactivated (FIG. 1) or activated (FIG. 2).

The disconnection device according to FIG. 1 is intended to allow at least two electrochemical cells (d) connected to each other to be disconnected by an inter-cell connection part (c). The device of FIG. 1 comprises a heat-activatable element (a) capable of deforming when its temperature reaches a threshold value and a holding member (b) for keeping the inter-cell connection part (c) in contact with at least one of the two electrochemical cells (d) when the temperature does not reach the threshold value.

The threshold value is predetermined by a user. It may be 80° C., 150° C., 200° C., 300° C., 400° C. or any other value.

When a temperature of the heat-activatable element (a) reaches the threshold value, it will deform so as to disconnect the inter-cell connection part (c) from at least one of the two electrochemical cells (d). Under the action of heat, the heat-activatable element (a) bends upwards and causes the inter-cell connection part (c) to lift. This lifting physically disconnects the inter-cell connection part from at least one of the two electrochemical cells (d).

Once the temperature decreases and reaches a value below the threshold value, the heat-activatable element (a) returns to its initial position when its deformation is of the reversible type. When the heat-activatable element (a) returns to its initial position, the connection between the two electrochemical cells (d) is restored by bringing the inter-cell connection part (c) into contact with the at least one of the two electrochemical cells (d).

EXAMPLES

Simulations were performed to show the effect of the device of the invention on the propagation of heat.

In the examples below, the arrangement of the electrochemical cells is as shown in FIG. 4. In this figure, it is considered that the central cell is in thermal runaway and the evolution of the temperature of cells 1 to 6 surrounding it is studied.

Nevertheless, for a good interpretation of the results below it is important to also take into account FIG. 3 which shows that the cells which are arranged horizontally side by side are more distant from each other with respect to the cells arranged diagonally (see FIG. 3 where a=6 mm and b=2 mm). This is explained by a different thickness of the foam surrounding the cells.

Thus, FIG. 4 should be interpreted in the light of FIG. 3, therefore, cells 3 and 4 are more distant from the central cell than cells 1 and 2 or 5 and 6.

It is also important to note that the simulations below were performed under the following conditions:
  The cells 5 and 6 are arranged in the vicinity of a cooling system;
  The copper negative terminal of the central cell is connected to the positive terminal of cell 3 via an inter-cell connection part, while the aluminum positive terminal of the central cell is connected to the negative terminal of cell 4 via another inter-cell connection part. Two disconnection devices are placed in contact with each one of these inter-cell connection parts;
  The copper negative terminals have a higher thermal conductivity than the aluminum positive terminals.
Various models were tested:
1st model: the electrochemical cells are all covered only with an epoxy-type foam (Foam);
2nd model: the electrochemical cells are covered with a ceramic-based sleeve itself surrounded by an epoxy foam (Sleeve+foam);
3rd model: a device according to the invention is used in the 2nd model described above (Sleeve+foam+disconnection device).

The simulation results are shown in FIG. 5. It should be noted—and this is important—that when there is no bar in the bar chart for a given cell in a given model, this means that in this model, the cell in question did not reach a temperature of 95° C.

In the case of the 1st model (standard foam), it is observed that cells 1, 2, 5 and 6 reach the temperature of 95° C. and are therefore in thermal runaway. Only cells 3 and 4 do not reach the temperature of 95° C. although cells 3 and 4 are directly connected to the central cell; this is due to the fact that cells 3 and 4 are farther away from the latter than cells 1, 2, 5 and 6 (cf. FIG. 3).

In the case of the 2nd model (sleeve+foam), it is observed that cells 1, 3 and 4 reach the temperature of 95° C. and are therefore in thermal runaway.

The good thermal insulation induced by the ceramic-based sleeve results in the heat being preferentially propagated by the inter-cell connecting parts, which explains the fact that cells 3 and 4 which are directly connected to the central cell by inter-cell connecting parts do reach this temperature. Cell 1 itself is in thermal runaway due to its proximity to the copper negative terminal of the central cell which has a higher thermal conductivity than an aluminum terminal, which is why the same heating is not observed for cell 2 which is close to the positive terminal of the central cell.

In the case of the 3rd model (sleeve+foam+disconnection device), only cells 1 and 3 reach the temperature of 95° C. and are therefore in thermal runaway. The cells 2, 4, 5 and 6 do not reach the temperature of 95° C. Thus, the disconnection device combined with the sleeve has made it possible to avoid the propagation of the thermal runaway to cell 4 which is directly connected to the central cell in thermal runaway.

The table below summarizes the number of thermal runaway cells for each of the models presented above.

TABLE 1

| Model No. | Number of cells subject to thermal runaway |
|---|---|
| 1 | 4 (cells 1, 2, 5, 6) |
| 2 | 3 (cells 1, 3, 4) |
| 3 | 2 (cells 1 and 3) |

This shows that the battery according to the invention not only avoids the propagation of thermal runaway to those cells connected to a failed cell via inter-cell connecting parts, but in addition reduces the total number of cells in thermal runaway.

The invention claimed is:
1. A battery comprising:
  i. at least two electrochemical cells (d) which are connected to each other by an inter-cell connecting part (c), each electrochemical cell comprising a container, said container comprising:
    α) an opening for introducing an electrochemical plate group,
    β) a bottom,
    γ) a side wall,
    δ) At least two current output terminals;
  ii. a material having a thermal conductivity less than or equal to 0.5 W/(m*K) disposed between the at least two electrochemical cells, and
  iii. at least one disconnection device for physically disconnecting said at least two electrochemical cells which are connected to each other by the inter-cell connection part, said device comprising:
    a heat-activatable element (a) capable of deforming when a temperature thereof reaches a threshold value,
    the heat-activatable element being arranged such that, when its temperature reaches said threshold value, it disconnects by its deformation the inter-cell connecting part (c) from at least one of the electrochemical cells (d), said heat-activatable element not partici- pating in the conduction of an electrical current when said electrochemical cells are traversed by an electrical current, said heat-activatable element being placed in contact with the inter-cell connection part (c) and a current output terminal.

2. The battery according to claim 1, wherein said disconnection device further comprises at least one holding member (b), said holding member being capable of occupying a first position and a second position.

3. The battery according to claim 2, wherein when a temperature of the heat-activatable element (a) is less than the said threshold value, the holding member (b) occupies the first position, in which the inter-cell connection part (c) is kept in contact with the at least one electrochemical cell (d) by the holding member (b).

4. The battery according to claim 2, wherein when a temperature of the heat-activatable element (a) is greater than the threshold value, the holding member (b) occupies the second position in which the inter-cell connection part (c) is not in contact with the at least one electrochemical cell (d).

5. The battery according to claim 1, wherein the deformation of the heat-activatable element (a) directly disconnects the inter-cell connection part (c) from said at least one electrochemical cell (d).

6. The battery according to claim 1, wherein the heat-activatable element (a) is capable of deforming when its temperature reaches a threshold value greater than or equal to 80° C.

7. The battery according to claim 1, wherein the heat-activatable element (a) is selected from the group consisting of a shape memory alloy, a bimetal, an intumescent material, a shape memory polymer, and a thermosensitive material.

8. The battery according to claim 2, wherein the holding member (b) is a calibrated spring, or a washer combined with a calibrated spring.

9. The battery according to claim 1, wherein the disconnection device does not act by restricting a cross-section for passage of current between the two electrochemical cells.

10. The battery according to claim 1, wherein the material having a thermal conductivity less than or equal to 0.5 W/(m*K) is in the form of a sleeve, a block, foam, a panel or paper.

11. The battery according to claim 10, wherein said material having a thermal conductivity less than or equal to 0.5 W/(m*K) is in the form of a ceramic-based sleeve in contact with a part or all of the side wall of an electrochemical cell.

12. The battery according to claim 11, wherein said ceramic-based sleeve is surrounded by a foam of a material selected from an epoxy, a polyurethane, a polyolefin, polystyrene, a polyester, a silicone.

13. The battery according to claim 10, wherein said ceramic-based sleeve has a thickness ranging from 0.5 to 50 mm, preferably ranging from 0.5 to 2 mm.

14. The battery according to claim 1, wherein said at least two electrochemical cells (d) are electrochemical cells selected from the group consisting of: lithium-ion cells, sodium-ion cells and lithium-sulfur cells.

15. The battery according to claim 1, wherein said at least two electrochemical cells (d) are of cylindrical, prismatic or pouch-like format (pouch cells).

* * * * *